US008001152B1

(12) United States Patent
Solan

(10) Patent No.: US 8,001,152 B1
(45) Date of Patent: Aug. 16, 2011

(54) METHOD AND SYSTEM FOR SEMANTIC AFFINITY SEARCH

(76) Inventor: Zach Solan, Tel-Aviv (IL)

(*) Notice: Subject to any disclaimer, the term of this patent is extended or adjusted under 35 U.S.C. 154(b) by 339 days.

(21) Appl. No.: 12/334,629

(22) Filed: Dec. 15, 2008

Related U.S. Application Data

(60) Provisional application No. 60/996,990, filed on Dec. 13, 2007.

(51) Int. Cl.
*G06F 17/30* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| 6,353,825 | B1 | 3/2002 | Ponte |
| 7,120,615 | B2 | 10/2006 | Sullivan et al. |
| 7,130,849 | B2 * | 10/2006 | Yayoi et al. .................. 709/217 |
| 2005/0055341 | A1 | 3/2005 | Haahr et al. |

FOREIGN PATENT DOCUMENTS

| EP | 1170677 | 1/2002 |
| WO | WO02/48912 | 6/2002 |
| WO | WO2006/115966 | 11/2006 |

OTHER PUBLICATIONS

Penev et al., "Finding Similar Pages In a Social Tagging Repository", *WWW 2008*, Apr. 21-25, pp. 1091-1092, ACM 978-1-60558-085-2/08/04.

Kuo et al., "Tag Clouds for Summarizing Web Search Results", *WWW 2007*, May 8-12, 2007, pp. 1203-1204, ACM 978-1-59593-654-7/07/0005.
Shepitsen et al., "Personalized Recommendation in Social Tagging Systems Using Hierarchical Clustering", *RecSys '08*, Oct. 23-25, 2008, ACM 978-1-60558-093-7/08/10.
Li et al., "Towards Effective Browsing of Large Scale Social Annotations", *WWW 2007*, May 8-12, 2007, Banff, Alberta, Canada, pp. 943-952, ACM 978-1-59593-654-7/07/0005.
Vechtomona et al., "Comparison of Twp Interactive Search Refinement Techniques", http://acl.Idc.upenn.edu/hlt-naacl2004/main/pdf/68_Paper.pdf.
Gabrilovich et al., "Computing Semantic Relatedness usig Wikipedia-based Explicit Semantic Analysis", pp. 1606-1611, http://www.aaai.org/Papers/IJCAI/2007/IJCA107-259.pdf.
Geffet et al., "Feature Vector Quality and Distributional Similarity", http://acl.Idc.upenn.edu/coling2004/Main/pdf/36-153.pdf.
Finkelstein et al., "Placing Search in Context: The Concept Revisited", ACM Transactions on Information Systems, vol. 20, No. 1, Jan. 2002, pp. 116-131.

* cited by examiner

*Primary Examiner* — Isaac M Woo
(74) *Attorney, Agent, or Firm* — Occhiuti Rohlicek & Tsao LLP

(57) ABSTRACT

A search interface and searching technology for interactive search refinement based on feature similarity (ISRFS), which provides an interactive search tool based on human associative and semantic knowledge. Given a query, the tool may retrieve the most suitable textual items in a repository of textual data that is categorized or/and partially tagged. In the user interface, an equalizer controller may be used to refine the search results, for example, based on manually or automatically extracted features and a graded semantic scale to adjust the weights of the various features. The technology may be applied to any data repository.

12 Claims, 11 Drawing Sheets

| $D_{11}$ | $D_{21}$ | $D_{31}$ | $D_{41}$ | $D_{51}$ |
|---|---|---|---|---|
| $D_{12}$ | $D_{22}$ | $D_{32}$ | $D_{42}$ | $D_{52}$ |
| $D_{13}$ | $D_{23}$ | $D_{33}$ | $D_{43}$ | $D_{53}$ |
| $D_{14}$ | $D_{24}$ | $D_{34}$ | $D_{44}$ | $D_{54}$ |
| $D_{15}$ | $D_{25}$ | $D_{35}$ | $D_{45}$ | $D_{55}$ |

Fig. 11

METHOD AND SYSTEM FOR SEMANTIC AFFINITY SEARCH

CROSS-REFERENCE TO RELATED APPLICATION

The present application claims benefit of U.S. Provisional Patent Application Ser. No. 60/996,990, filed Dec. 13, 2007 and entitled Method and System for Semantic Affinity Search, the entire contents of which are incorporated herein by reference.

BACKGROUND OF THE INVENTION

In the current state of internet search technology, the keywords typically must appear in the title or description of the item being searched in order to be located and listed as a search result. Moreover, in such a search, extra or additional keywords (search terms) entered in order to better define the searched items often impair or unnecessarily constrict the results, sometimes even returning no results at all (zero matching) due to the Boolean nature of the search.

SUMMARY OF THE INVENTION

Some embodiments of the present invention may introduce a textual search technology, which may be called "interactive search refinement based on features similarity" (ISRFS). ISRFS may be an interactive refinement search tool that may be based on human associative and semantic knowledge, which may address, for example, two aspects of searching. One aspect may be the ability of a search engine to automatically index large collections of textual items according to their main semantic concepts. Another aspect may be the ability to provide a good estimator that may measure semantic affinity between any textual item and a collection of pre-defined semantic target features. A system, according to embodiments of the present invention, may meet, for example, both of these requirements and in some embodiments together with a graphical user interface (GUI) that may allow the user to easily control the affinity quality and the search process. Given a query, a tool according to embodiments of the invention may retrieve the textual items having high affinity to the user's searched item from a repository of textual data. An equalizer controller may be used to refine the search results based on, for example, semantic similarity, automatically extracted features, and a graded semantic scale, known as semantic affinity metric (SAM).

A known method in textual search is the tag clouds (TC) technology. TC technology is a visually-weighted representation of concepts. Tags may be assigned to textual items manually or by means of automatic indexing. Feature extraction, feature generation, feature selection, feature construction, and constructive induction are all examples of sub-domains of the general problem of indexing. Associative qualities between a tag and the entity it describes, such as the frequency of use of the tag/entity, may be visually represented with variable font sizes and colors. For example, more frequently used tags may be presented using larger and/or brighter fonts, compared with the less frequently used tags. Hyperlinks to the resources described by each tag, or similar reference methodology, may be provided for navigation. When a user clicks on a specific tag, s/he may be referred to other items that share exactly the same tag. In that sense, the navigation is equivalent to a Boolean search. Tag clouds are also used as an interface paradigm, for example, in projects that need to find visually appealing ways to summarize vast amounts of data.

According to embodiments of the present invention, the TC technology may be modified to provide the user with an enhanced search experience and a user-friendly interface that may enable the user to easily define target features and their respective weights, which may be gradually changed to have any value between the lower and upper limits of a range of weights. According to embodiments of the present invention, the user may easily control the search outcome with higher semantic resolution and graded semantic scale as compared to what the Boolean nature of the TC technology may otherwise permit. According to embodiments of the present invention, ISRFS technology may provide a graded matching level between the target of the search and the textual items being searched through. A user may define the item s/he is looking for to have "more of feature A" and/or "less of feature B," etc.

A method according to aspects of the invention may take advantage of both the core algorithmic level and the unique user interface. A user or a consumer search tool application may be used throughout some of the following explanations merely as an example to illustrate the technology, which, in general, may be applied to any textual repository. The semantic affinity search may consist of two steps. A first step may be a semantic search and a second step may be a semantic refinement. This two-step procedure may reflect an intuitive and efficient search strategy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 11 is a schematic depiction of the D matrix for summing up the conditional probabilities among the features in the item list according to embodiments of the invention.

Figure 1A:
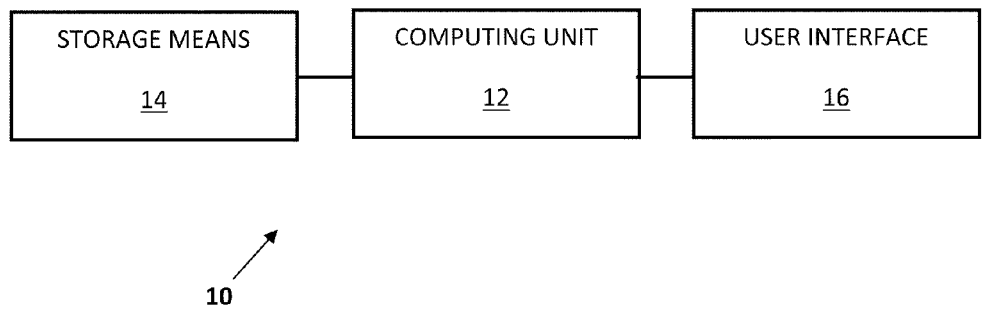
FIG. 1A is a schematic block diagram of a system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following sections methods, data structures and data flows of a system according to embodiments of the invention are described, in which the following terms will have the meaning written next to them.

The term items should be expansively construed to refer to searchable entities, such as pieces of text, image files, audio files, Internet sites, web pages, etc., including metadata. An item may contain some kind of a textual description and/or a list of features that characterize the item. A system according to embodiments of the invention may aim, as a refinement process progresses, to retrieve the most relevant items from a repository according to the user's needs.

Features should be expansively construed to refer to one or more characteristics that represent or are associated with an entity.

The feature space should be expansively construed to refer to a mathematical model in which entities are represented as points within the space. Similarity between entities may be represented by a function of the distance between the entities in the space, such that entities represented by points that are closer to each other are more similar than are those represented by points that are more distant from each other. The feature space may be a multidimensional space, e.g., a space having more than three dimensions, where each feature may be represented in a separate dimension. The number of dimensions may be determined by the number of features of the space. It will be recognized that each feature need not be uniquely identified with a dimension, for example, in some embodiments, some features, for example, related or correlated features, may be collapsed into a single dimension. Each feature may identified by a unique identifier key denoted hereinafter as FeatureID key.

A feature vector should be expansively construed to refer to an item in the multidimensional feature space as a single point. The vector elements are real values that indicate the significant contribution of each feature to the general idea that is expressed in the item description. Zero weight may indicate that the feature is not relevant to the item's concept while a value of one may indicate the maximal contribution of the respective feature to the general concept. According to some embodiments of the invention, the feature space may be highly sparse, such that the majority of the feature vector elements are zeros.

A query feature vector should be expansively construed to refer to a feature vector used as a prototype vector to retrieve the most relevant items in its vicinity.

A semantic network should be expansively construed to refer to a mathematical model of knowledge representation. A semantic network model may be based on a graph representation, in which vertices represent entities and edges represent semantic relations between the concepts. An edge may be characterized by a weight that indicates the relation's strength.

A database should be expansively construed to refer to a repository of items that are searchable and/or accessible by the system. The database may be structured as a plurality of items, each of which includes a number of features, and may be implemented, for example, in a table form. Each item in the database may be assigned a unique identity, denoted herein below ItemID.

An ontology should be expansively construed to refer to a hierarchical relation of categories, for example, in tree form. The tree nodes may represent categories, and edges may represent the hierarchy relations. Each node may have a unique identifier NodeID and items may be assigned to the tree nodes according to their concept category.

Figure 1B:
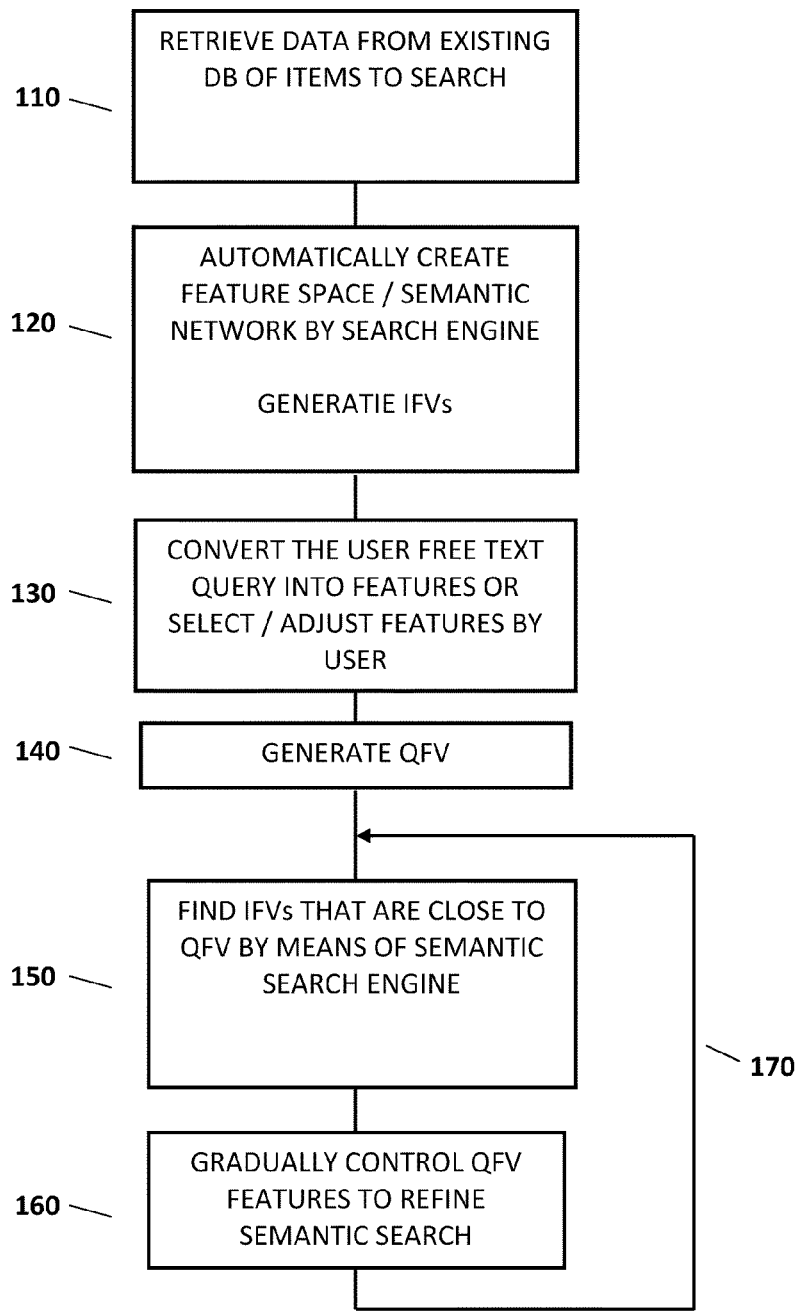
FIG. 1B is a schematic flow diagram representation of a search process scheme according to embodiments of the present invention.

Reference is now made to FIGS. 1A and 1B, which are a schematic block diagram of a system 10 and a schematic flow diagram representation of a search process scheme according to embodiments of the present invention. System 10 may comprise a computing unit 12, including a central processing unit, in communication with a storage means 14 and with a user interface unit 16, which may include a display for output, and a keyboard and/or pointer for input. A process according to embodiments of the present invention depicted in FIG. 1B may begin with retrieval of data of items to be searched from an existing database located, for example in storage means 14 (block 110). A reliable semantic network, or a features space, may automatically be created, for example, by a search engine executed by computing unit 12, to generate at least one item feature vector (IFV) (block 120). The search engine may be implemented, for example, by software program that is executable in computing unit 12. Other implementations are possible. In some embodiments of the invention, the user may type a free text query and the system may convert it into list of features and initial weights, which the user may then refine, or the user may directly initiate an advanced search by selecting and/or adjusting one or more features affecting the search process (block 130). A query feature vector (QFV) may be generated (block 140) using, for example, the features selected/adjusted by the user. The method and system according to the invention may look for, and retrieve, IFVs which are closer to the generated QFV and present them to the user (block 150), for example via user interface unit 16. The features of the retrieved IFVs, which may represent items having weighed features and that are closest to the searched QFV, may further undergo a semantic refinement process in which the weights of their features may gradually be controlled or modified by the user, for example, using the user-interface described below (block 160). The steps of blocks 150 and 160 may be repeated (via path 170) as many times as may be needed or required by the user to obtain satisfactory results. Repeating steps 150 and 160 may produce an updated list of retrieved items which may more closely match the desired goal.

Figure 2:
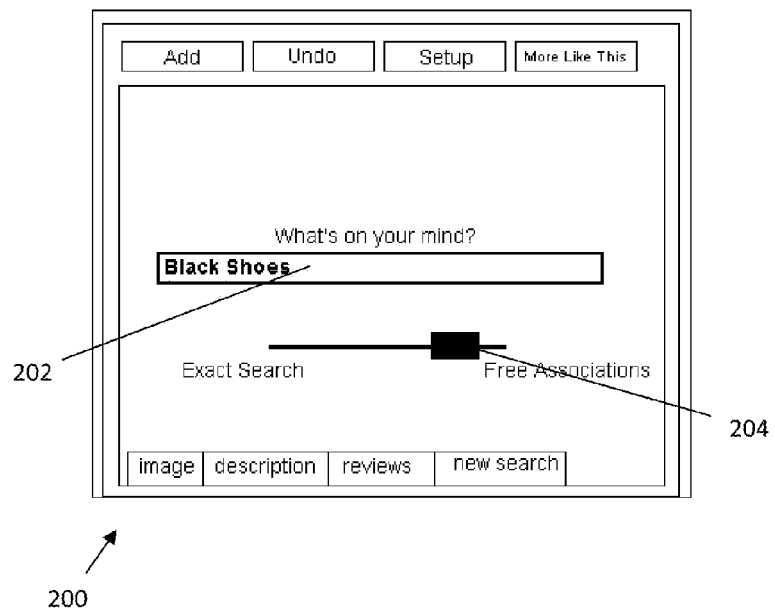
FIG. 2 is an example screen shot of a free search using general terms according to embodiments of the present invention.

Reference is now made to FIG. 2, which is a sample screen shot 200 of a free text search using general terms or keywords according to embodiments of the present invention. According to the example provided, a user, which may be a person surfing the Internet, a potential customer browsing a particular company's published items, etc., may search for a particular item, for example comfortable black men's leather shoes. The user may describe what he wants in general terms, for example by typing "black shoes" as shown in free text window 202 (block 130). In one embodiment of the invention, the user may select the initial level of matching desired, where the level of matching may range from exact match to free association, using, for example, gradual control slider 204. The initial level of matching selected by the user may define the level of fuzziness used for searching for matching items, such that free association may retrieve more fuzzy results, and exact match, for example, may retrieve results of a purely Boolean match. In some embodiments of the invention, the value along the It will be recognized that in some embodiments of the invention, the user may go directly to an advanced search page, in which the particular features and weights may be entered directly, as described below.

Figure 3:
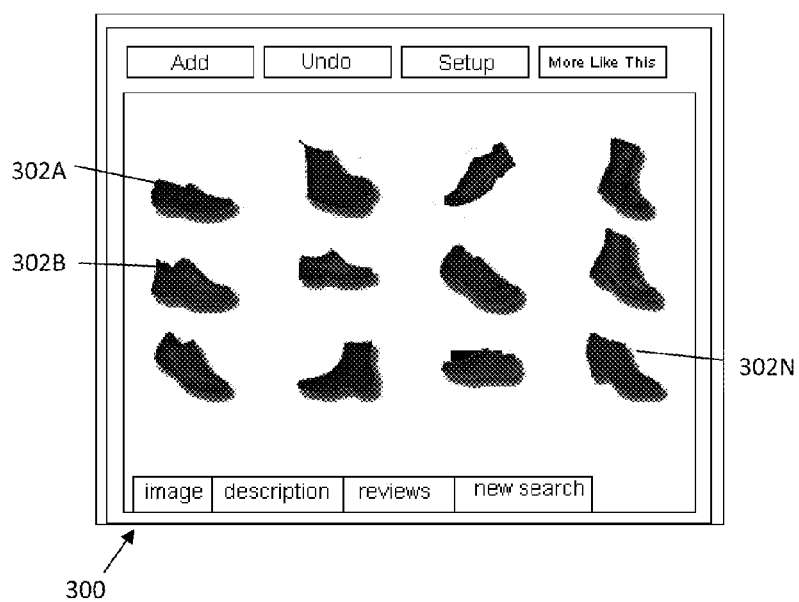
FIG. 3 is an example screen shot of a results page according to embodiments of the present invention.

Reference is now made to FIG. 3, which a sample screen shot 300 of a results page according to embodiments of the present invention. Activation of a search query defined using the screen of FIG. 2 may retrieve a plurality of items 302A, 302B . . . 302N, which may suit the user's description In the example provided, the results may all have the feature(s) described by "black shoes", but the results may differ in many other possible features, such as high/low heel; level of comfort, etc.

Figure 4:
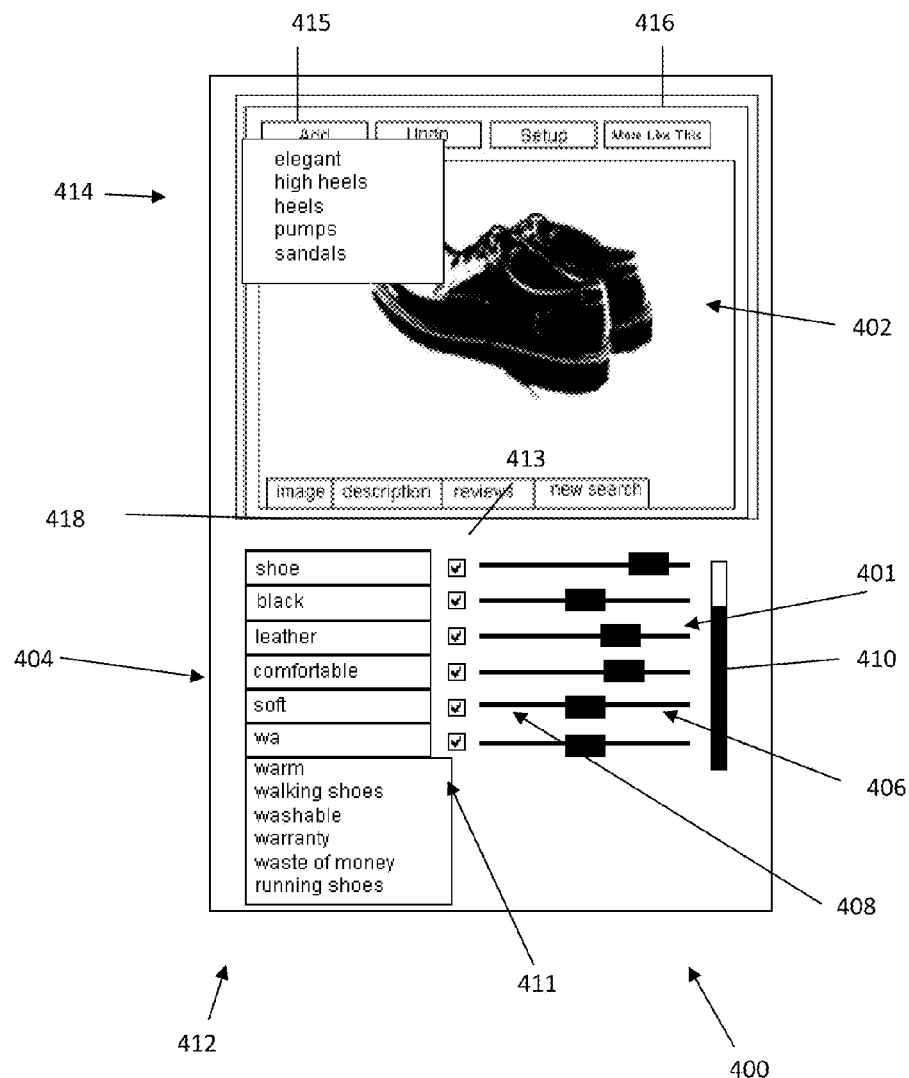
FIG. 4 is an example screen shot of a semantic equalizer controller according to embodiments of the present invention.

Reference is made now to FIG. 4, which is a sample screen shot 400 of an advanced search screen, which may include a semantic equalizer controller according to embodiments of the present invention. It will be recognized that in some embodiments of the invention, the search may begin with such a user-interface screen. The user may refine the search parameters ('shoe' and 'black' 401) by selecting an item presented in screen 300 (FIG. 3) as more closely approximating the target, and thereby retrieving list 408 of parameters and weights that further define the item concept ('leather', 'comfortable', 'soft' and the like), as exemplified by the selected item. It will be recognized that some features may be previously submitted (e.g., shoe', and 'black'), and some features may be suggested based on the selected item. The user may then refine the query by redefining the relative weights of each component of the search query 401 and/or by adding additional parameter(s) from list 408 to the search query 401 using the select/deselect option 411 or/and adding additional parameters by typing free text 412. For example, the user may redefine the relative weights of the features in the query search using the sliders set 406. It will be recognized that alternatives or equivalents to the sliders are possible, for example, selecting a discrete weight on a scale of 1 to 5, etc. The user may add features from list 408 to the search query 401 by selecting one or more features from the list using the select/deselect option 411 and redefine their relative weights using slider set 406. The user may add features to feature list 404 by typing free text which may invoke a list of optional features 412 based on textual similarity. The user may add features from a predefined list of features 414. The user may remove one or more features from the features list, for example by de-selecting the one or more features using the select/deselect option 411. The user may present a description of the presently selected item 402 in one of a variety of description manners such as presenting its image, its written description, reviews of the item etc. by selecting the respective description tag 413. Finally, when the user is satisfied with the re-definition of the item's features he may initiate another search iteration by using select button 416. This process of refining may be repeated until the user has reached a target item.

In some embodiments of the invention, for example, due to space considerations of the input device, e.g., a mobile phone, PDA, handheld, etc., a weight need not be manually entered in association with a search feature. In one example, a user interface on a computing device may be too small to display sliders to continuously vary the weights of search features. If the weight is not entered manually in the one or more data input fields, the computing unit may automatically determine a weight to be associated therewith. For example, a computing unit may refine the search features and/or weights without user input. In this embodiment, the user interface may display sliders for some (but not all) or even none of the search features, and the user may only control the search features and not the weights associated therewith.

Figure 5:
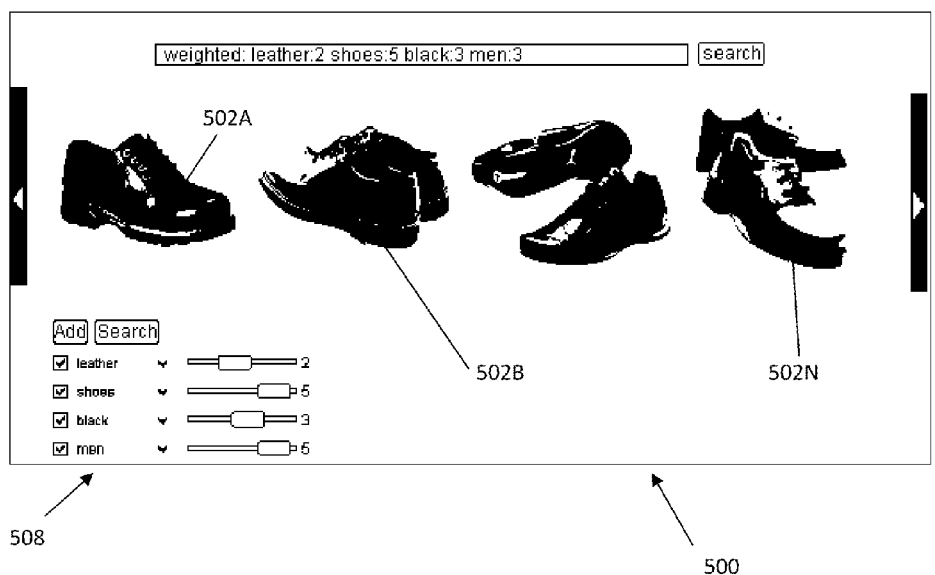
FIG. 5 is a screen shot of an interface that enables carrying out steps for defining and refining search parameters according to embodiments of the invention.
Figure 6:
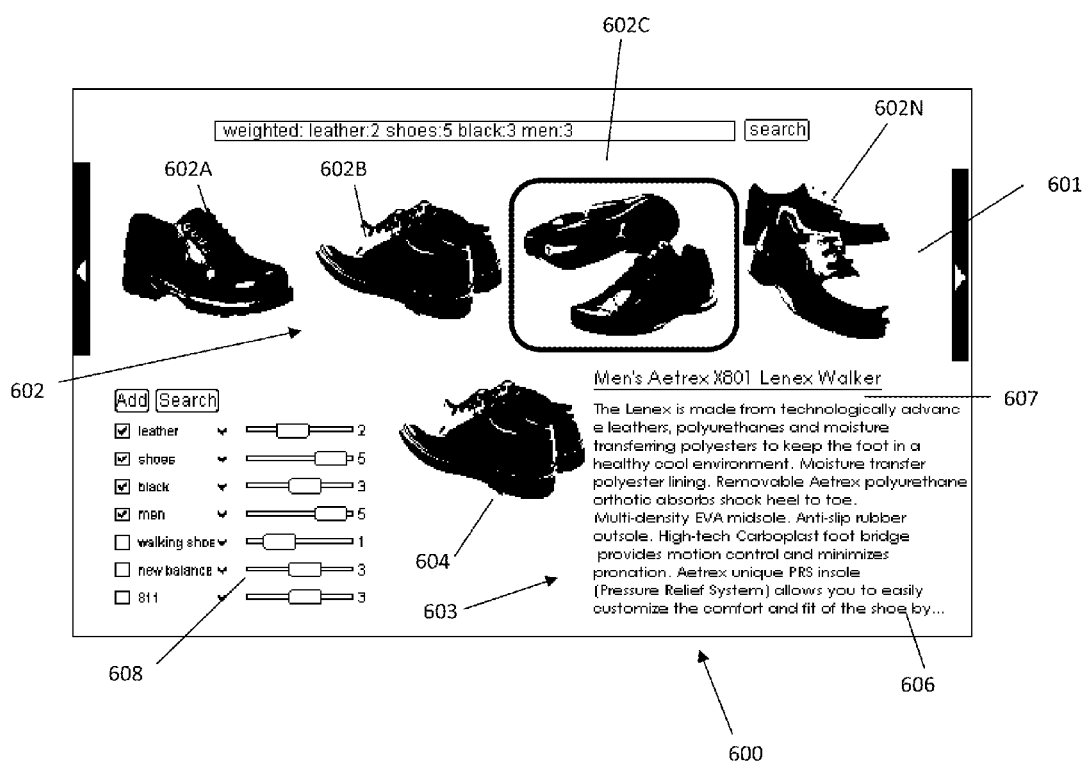
FIG. 6 is a screen shot of an interface with a semantic controller according to some embodiments of the present invention.

Reference is made now to FIG. 5, which is a sample screen shot 500 of an interface for defining and refining of search parameters according to embodiments of the invention, such as steps 130, 140, and 150 of FIG. 1. Reference is also made to FIG. 6, which is a screen shot 600 of an interface with a semantic controller according to some embodiments of the present invention, which may enable carrying out steps of refining of search parameters, such as steps 150 and 160 of FIG. 1, and which may control the semantic affinity matching process. According to embodiments of the present invention, the method or system may assist a user to find more exact terms that better define the request by offering alternative terms, which may be reflected in an alternative approach. The system and method may respond to a query with more items 502A, 502B . . . 502N according to the user's modification(s), as shown in screen 500. Screen 500 may present search results that may have been received before the semantic refinement takes place, according to some embodiments of the present invention. Screen 500 may comprise slider set 508 with select/deselect to enable selection of search features and defining their relative weights. FIG. 6 shows screen 600 shot with additional user interface features compared with the user interface features of screen shot 500, which may enable, when a certain item 602C in screen shot 600 is selected, displaying additional graphic information 604 and, in window 603, textual information 606 and link 607 for presumably more information on selected item 602C.

Figure 7:
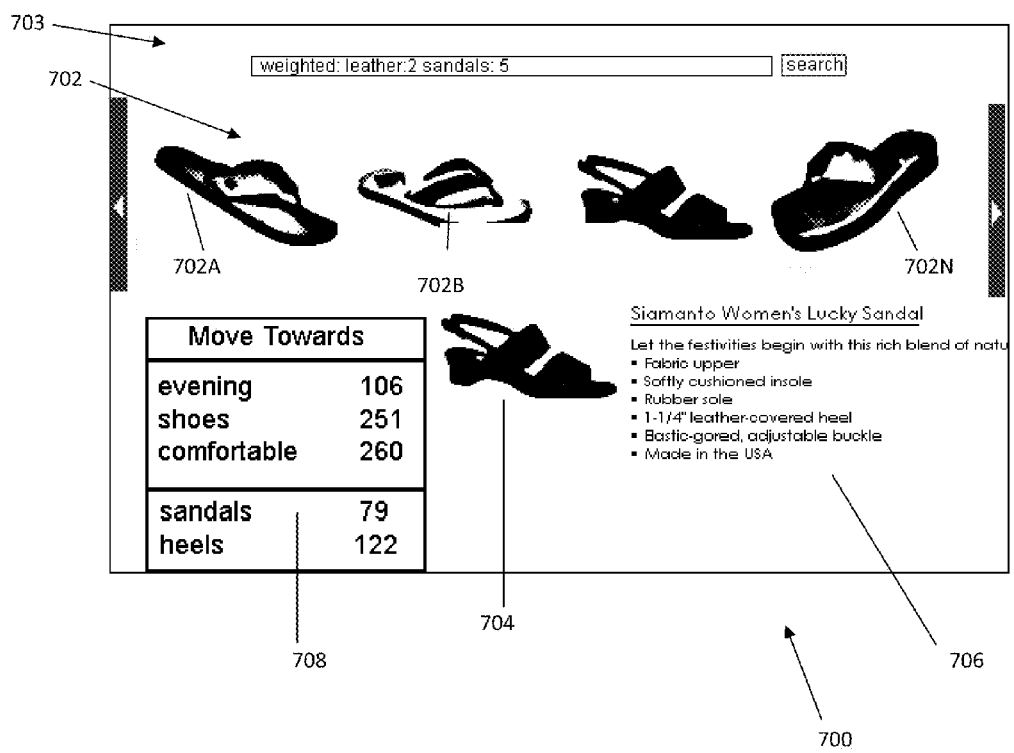
FIG. 7 is an example screen shot of a graphical user interface with a semantic controller according to embodiments of the present invention.

Reference is made now to FIG. 7, which is a sample screen shot 700 of a graphical user interface with a semantic controller according to embodiments of the present invention. Screen 700 provides an interface which may translate the semantic space distances into real (spatial) distances. Controller 708 may be designed like a direction sign and may provide the user with an easy way to move towards any desired direction(s) in the semantic space, for example towards 'evening', 'shoes', 'comfortable', 'sandals' and 'heels'. Other representations, for example, graphical representations, may be possible. When the user selects a specific item 702B from list 702 of FIG. 7, a new window 703 may open, presenting some details about the product, such as its image 704, textual description 706, price (not shown), etc., and a sign direction 708 that may specify the neighboring features and their distances. The user may move towards any one of the features by clicking on a feature hyperlink in 708. Once the user has clicked such a hyperlink in 708, items may be retrieved that are located along and in close distance from the feature axis. The progress towards a specific direction may be graded and the user may click several times on the same feature and get different results. For example, after the user asks for black, high-heeled shoes, he may move towards more comfortable shoes. The first click on the "comfortable" link in 708 may provide the most comfortable high-heels shoes. The next click on the "comfortable" link may present black shoes with lower heels (as they are more comfortable); another click may retrieve flat black shoes; and yet another click may retrieve black comfort slippers. This example demonstrates the outcome of moving along the 'comfortable' axis. Such progress along a specific axis in the semantic space may be considered equivalent to pushing a slide bar of a respective feature in the "semantic equalizer" of FIG. 4 to the left or to the right. As in a previous semantic controller, such as 406 of FIG. 4, the focus here may also be on graded progress towards a specific direction. Such a visualized approach may be implemented, for example, in virtual worlds. A system and method according to embodiments of the invention may be used to build a visual virtual world to represent the feature space that is based on the feature space metric. In such visual virtual feature space the items may be located as 3D images in different 'geographical' locations according to their feature space spatial locations. The user may explore the world and "walk", or progress in the feature space towards his target. Direction signs as appear in FIG. 7 can be used as navigation tool to facilitate the search process and help the user reach his final target.

A similar process may be used in the ISRFS technology. In a first stage, the user may define a main concept of the search by using his own terms and keywords (similar to step 130 of FIG. 1). These terms may then be translated into a list of weighted features (step 130) and then the QFV may be generated (step 140), and may then be used to search the repository, which may be represented using, for example, feature space or semantic network, semantically (as in step 150). Relevant items may be retrieved and appear in the result section of the page. The user may explore in detail any item and refine the query accordingly by adding/removing features and by changing the feature weights (as in step 160). Once the user is satisfied with the current state of the features and weights, he may activate another search session, for example by clicking the "Go" button and in response, the method and system of the invention may populate the result section with the new or updated list of relevant items, optionally with higher semantic affinity. The user may refine the search by adjusting the associative strength of at least one feature that describes the item, as shown in screen 400 of FIG. 4, or by using the interface of screen 600 of FIG. 6. These features and their weights may be extracted automatically in an offline process. The user may change the weight of each feature by using slide bar controls and in response the system may populate the results list with the new relevant items having high semantic affinity. Such an iterative procedure may converge after several steps and bring the user closer to the desired target.

The ISRFS architecture may make use of human associative and semantic knowledge for extracting the most likely concept(s) and item(s) for any given keyword set(s). Thus, for example, when a user searches for "black shoes" he may be shown many different black shoes and not a book that mentions the words "black shoes". In contrast to a regular keyword search, where typically the keywords are merely required to appear in the title or description, semantic search according to embodiments of the invention may use fuzzy matching, which may take into account external knowledge provided, for example, in the form of a table of word pairs that are semantically or associatively related, which may be or have been acquired in an automatic manner. Thus, adding more keywords as part of a semantic search query may invoke improved results, in contrast to a regular search, in which extra keywords often impair the results, sometimes returning no results at all (zero matching) due to the Boolean nature of the search. In this respect, the system of the present invention may provide the user with the ability to control the fuzziness level of the matching process. When the fuzziness level is set to zero, the system runs in an "exact match" mode, the same method that other, prior art search engines utilize. A middle level, which may be, according to embodiments of the invention, the default mode of the system, may provide a balanced way to find the most likely concept and may bring items with high level of affinity. For example, when the user searches for "comfortable black shoes" relevant items may be retrieved even when these specific words do not appear in the title or description of one or more of the product. The upper bound of the fuzziness range (i.e., fully associative search) may provide a useful way to discover many new concepts that are related (semantically and associatively) with the query, but may not immediately be apparent (a "thinking-outside-the-box" approach). Thus, for example, when a user asks for "running shoes," "running accessories" or "sport socks" may be associatively identified as part of its results list. When the user finishes defining required features for the search, for example by pressing or clicking the ENTER key, the query in the text box may be translated into a list of features and weights, such as, for example, a set of pairs, for example, the feature 'black' having the relative weight 0.5 and the feature 'shoes' having the relative weight 0.5. The list may then be displayed in the query features list (QFL), such as feature list 404 of FIG. 4.

Figure 8:
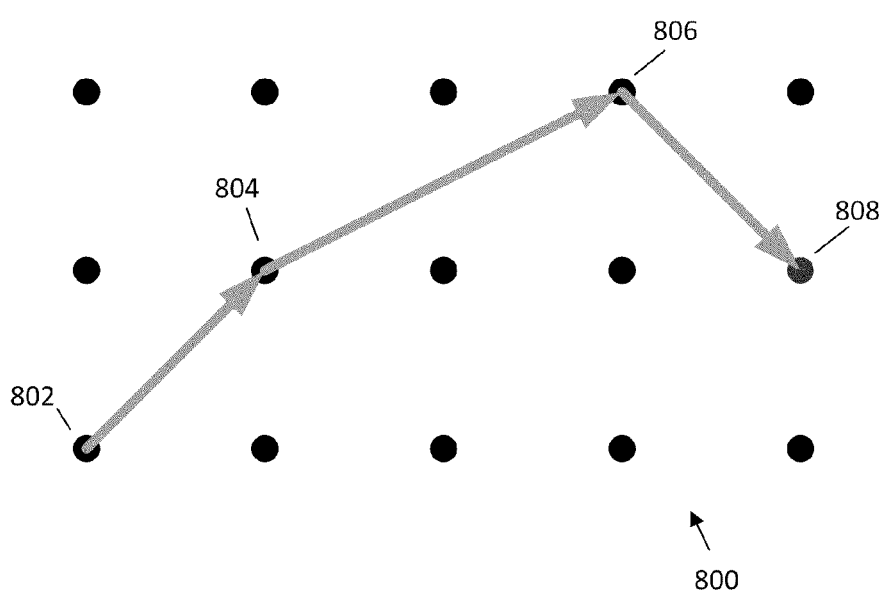
FIG. 8 is a schematic depiction of moving towards a target in a multi-dimensional space according to embodiments of the present invention.

Reference is now made to FIG. 8, which is a schematic depiction of a method for steering or refining a search towards a target in a multi-dimensional space 800 according to some embodiments of the present invention. It will be recognized that while the depiction uses a two-dimensional illustration, embodiments of the invention are not limited in this respect, and may include any number of dimensions. The points in multi-dimensional space 800 may represent various items with various levels of similarity to a target. The feature representation may be a useful method to identify similarity between items. Upon identifying an item that resembles the target, the user may use control(s) offered by a system according to embodiments of the invention, to move, or steer, towards that target. Such a steering approach in the feature space may be visualized as a path in a multidimensional space, in which the turning points refer to user interventions during the process of refinement. Points 802, 804, 806 and 808 may represent four consecutive interventions of the user in the search process, in which, by selecting a new item having different level of resemblance to the target, the search process is steered further. It will be recognized that a method or system according to the present invention should preferably have the ability to correctly map each item in the feature space, such that the space is consistent and reliable. Typically, the feature description is very noisy and incomplete.

In some embodiments of the invention, features may be assigned manually by a user or may be extracted automatically, either before the search, or in connection with performance of the search. For example, one common manual method for feature assignment is a technology known as the Tag Cloud (TC) interface. Tags may be represented by keywords or terms associated with (or assigned to) pieces of information. The TC paradigm was found as a visually appealing way to summarize vast amounts of data. Tags are usually chosen informally and personally by the item's author/creator or by the item's consumers, viewers, or community. Tags are typically used for resources such as computer files, web pages, digital images, and internet bookmarks. The qualities of associations between each tag and the entity it describes, such as, for example, the frequency, are visually represented with variable font sizes and colors (e.g., the more frequently used tags may be larger or brighter than the less frequently used tags). Hyperlinks to the resources described by each tag are often provided for navigation and associated with the text of each feature. When a user clicks on a specific tag, he is referred to a sub-set of items that share the tag. In that sense, the navigation is equivalent to a Boolean search of a single term.

In addition to the above, there are many automatic techniques available and known in the literature as feature extraction algorithms. Extraction algorithms may extract features from a plain text when feature descriptions are far from optimal. Two similar items may be mapped into two distinct feature dimensions, e.g., shoes vs. shoe. Without an external knowledge base to identify these two features as related, they items may be located in two different subspaces. The same problem may occur in regular search engines when users enter several terms and the search engine cannot find a single document or item that exactly matches all the terms (although there are many relevant documents or items) due to the Boolean nature of the problem. To overcome this problem and obtain a reliable feature space, a semantic network may be used that may be a combination of knowledge that is acquired automatically from input data and external knowledge that may be imported from external files or other external sources of information.

The use of a semantic network may achieve several goals. First, if feature weights are not available, the semantic network may estimate these weights and may transform any list of features that corresponds to an item into a valid feature vector, as is detailed below. Second, a semantic network may provide a reliable way to measure distances between items in the feature space even when the items may have different features and their representations may be incomplete (see infra). Third, the network may work within the context-sensitive mode, in which the distances between features change according to the context or current category as is detailed below.

Once the feature space is reliable and consistent, the user may create a query feature vector (QFV) (blocks 130 and 140) that may be used as a prototype for a search. The user may generate the QFV explicitly by adding features and weights, or by writing a free text query, which then may be converted into a QFV representation. A system according to embodiments of the invention may represent at least some of the items in the database as item feature vectors (IFV) (block 150). An IFV may be generated by the system on the fly, during the performance of a search refinement, or in an offline process. Then, the system may locate all the IFVs in the neighborhood of the QFV using the feature space metric and may present them to the user by any of title, written description, image, etc., sorted by their distance from the QFV, for example, closer items appearing first. Then the user may select an item that best fits his needs, and appropriate information available in the database may be presented. Controls, such as presented in FIG. 4, may be used to present the IFV side by side with the QFV 408 and 406, respectively. Next, the user may choose those features that may best describe the target and may add them to the QFV. The user may also remove features from the QFV, change their weights, or add additional features, for example, by writing them in a free text box. The same process may be repeated several times with the user approaching the target successively closer with each iteration until eventually the user reaches the target sufficiently close.

The feature space metric (FSM) may be based on a mathematical model of knowledge representation, which is known as the semantic network framework. The FSM may be a multidimensional space where each feature is represented in a separate dimension and an item is represented by a single point. Given an item description, a simplistic or trivial approach may first identify substantially all the features that appear in the item description and set the relevant feature vector elements to 1. Then a distance metric may be used to measure the similarity between any two items. However, such an approach may not be effective in some cases, for example, where similar items may contain different features, e.g., shoes vs. shoe. To overcome this problem, a knowledge base may be maintained to map the relations between the features. A semantic network may serve as such a knowledge base.

Figure 9:
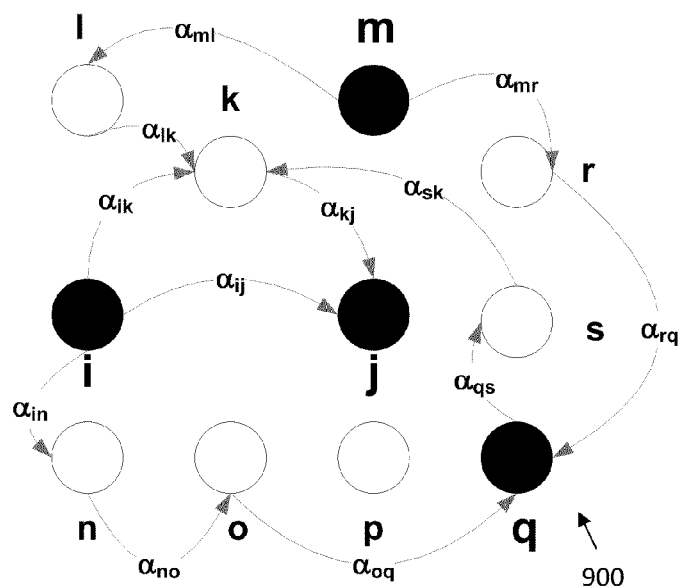
FIG. 9 is a schematic depiction of a semantic network according to embodiments of the present invention.

A semantic network framework may be a methodology that may capture the relations between the features. Reference is made now to FIG. 9, which is a schematic depiction of a semantic network 900 according to embodiments of the invention. Relations between features are shown by means of a graph consisting of vertices that may represent the features, and edges that may represent the relations between the features. The graph of semantic network 900 presents four members of a feature list (i, j, q, m) and relations between the features (k, n, o, p, etc.) according to some embodiments of the present invention. FIG. 9 shows features and edges that represent relations between the features. Each edge may have a weight a that indicates the relation's strength.

Further, it will be recognized that each node in the network represents a feature while a directed edge that connects two features, or nodes, in the network, for example, an edge that starts at feature i and ends with feature j, corresponds to a significant semantic strength that exists between the features, for example, the semantic strength between features i and j. The strength of the connection between the arbitrary features, or nodes, i and j is indicated by the relative weight indicator $\alpha_{ij}$ attached next to edge ij. For example $\alpha_{ij}$ may be the conditional probability of the two features i and j appearing together in the same item, thus an edge between features, or nodes, i and j corresponds to the conditional probability of j given i, that is, p(j|i). It will be recognized that the edge need not be symmetrical, and that an edge in the opposite direction may correspond to the probability p(i|j), which may differ from p(j|i). According to embodiments of the invention, an advantage of the network representation, such as, for example, network 900, includes the ability to calculate the semantic strength between any two feature nodes $F_i$ and $F_j$ even when the two nodes do not share a single connection, or edge. For that purpose the system may find first the shortest path that connects features, or nodes i and j by using, for example, the Dijkstra algorithm and then, by applying the chain rule on the sequence of probabilities along the path, the conditional probability of feature $F_j$ given feature $F_i$, or vice versa, may be retrieved. The chain rule may be based on the assumption of independence of network probabilities, as in, for example, Bayesian networks. The semantic strength is an asymmetric function, where $\alpha_{km}$ is not equal $\alpha_{mk}$. Equation 1 shows the chain rule:

$$p(j|i) = \prod_{(k,m) \in path(i \to j)} \alpha_{km} = \prod_{(k,m) \in path(i \to j)} p(k|m) = \exp\left(\sum_{(k,m) \in path(i \to j)} \ln(p(k|m))\right) \quad (1)$$

It will be recognized that the chain rule of Equation 1 can be easily calculated by the sum of the natural logarithms of the probabilities rather than the product of the probabilities.

A semantic network may be generated automatically. In some embodiments of the invention, the conditional probability between any two features $F_i$ and $F_j$ may be calculated in the following way.

First, all items in the database may be scanned and the number of times that each one of the features appears may be counted. The results may be stored in vector V(N), where N is the total number of features. Thus, v[i] may indicate the number of items that contain feature i.

Next, all the items in the database may be scanned, and for each pair of features the number of times that the two features appear may be counted together in the same item. The results may be stored in an array of data items addressable using two coordinates, such as a matrix M(N, N), where N is the total number of features. Thus, M(i, j) may indicate the number of items that contain both features i and j.

Then, for each pair of features (i, j), the conditional probability $\alpha_{i,j}$ may be calculated using Equation 2:

$$\alpha_{ij} = p(F_j | F_i) = \frac{p(F_i \cap F_j)}{p(F_i)}, \quad (2)$$

where N is the total number of items;
$p(F_i)$ is the probability of feature $F_i$ (the number of items contain feature $F_i$/N); and
$p(F_i \cap F_j)$ is the joint probability of $F_i$ and $F_j$ (the number of items that contains both feature $F_i$ and feature $F_j$, #$F_i$ $F_j$, the number of times $F_i$ and $F_j$ appear together in an item, divided by the total number of items.

It will be recognized that systems and methods according to the present invention may operate in a context-sensitive mode. Instead or in addition to counting the total number of appearances of features and their pairs in the entire database, the system may run the same analysis only on those items that share the same category C. Thus, the strength between two features $\alpha_{i,j}$ may be expressed as a function of the category $\alpha_{i,j}(C)$. For example, the strength between "thong" and "flip-flop" may receive a very high ranking in the category of shoewear and sandals and low in others, for example, electronics or bathing suits.

When the weight of an edge is beneath a certain global threshold that may be configured, the system may remove this edge from the graph or may refrain from presenting it to the user. The threshold may be set by a user or an administrator, for example, to filter out noise or bad results.

Figure 10:
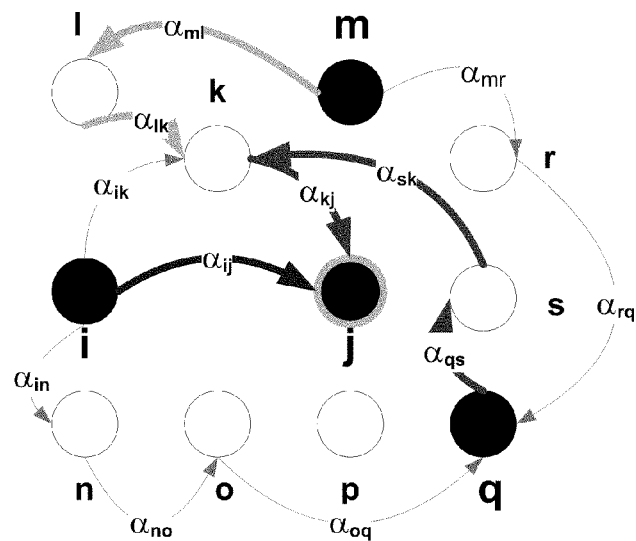
FIG. 10 is a schematic depiction of the shortest path between example features in a semantic network according to embodiments of the present invention.

A system according to embodiments of the invention may use a semantic network to generate a valid feature vector. Given a list of features of an item, where these features may be a product of manual tagging, category name, and/or automatic feature extracting methods, features in the semantic network may be identified. In the example of FIG. 10, there are four features, or vertices, in semantic map 900 representing a list of features i, j, m, q, which appear as solid black circles. An analysis may be performed, which may sum up the conditional probabilities of each one of features given all other features. When two features from the list are not connected directly by a single edge, the system may find the shortest path between these two vertices using, for example, the Dijkstra algorithm, and then the system may use equation 1 to calculate the total conditional probability. Matrix D may sum up all the conditional probabilities among the features in the item list, such that element D(u,v) contains the conditional probability $p(N_v|N_u)$ according to Equation 3 and Equation 1, where u and v may represent any pair of features in the semantic space:

$$D(u, v) = p(N_v | Nu) = \prod_{(k,m) \in path(u \to v)} \alpha_{km} \quad (3)$$

Reference is made now to FIG. 10, which is a schematic depiction of the semantic network 900 according to embodiments of the present invention. In the example of FIG. 10, matrix D may be calculated in the following way:

$$D = \begin{pmatrix} 1 & 0 & 0 & 0 \\ \alpha_{ij} & 1 & \alpha_{in}\alpha_{no}\alpha_{oq} & 0 \\ \alpha_{qs}\alpha_{sk}\alpha_{kj} & 0 & 1 & 0 \\ \alpha_{mi}\alpha_{ik}\alpha_{kj} & 0 & \alpha_{mr}\alpha_{rq} & 1 \end{pmatrix} \quad (4)$$

A procedure and a method of generating a valid item feature vector (IFV) given a list of K item features $P^R$, according to embodiments of the present invention is described. Any "bag of words" manual tagging approach may be used to populate the list, for example, using the following procedure. For each feature $N_i$ in an Item Feature list $P^R$, calculate the shortest path from feature $N_i$ node to each one of the feature $N_j$ nodes in the semantic network using, for example, the Dijkstra algorithm. For each feature $N_j$, calculate its conditional probability $p(N_j|N_i)$ according to, for example, the chain rule in Equation (3) and put the result into element D(i,j) of a matrix D. Then, the IFV may be calculated using Equation (5):

$$IFV(v) = \bigoplus_{l=1...K} D(u, v) \oplus \bigoplus_{l=1...K} D(v, u), \quad (5)$$

where the sign $\oplus$ is a special sum operator which is defined as: $A \oplus B = A + (1-A) \cdot B$, such that in the general case, $$\bigoplus_{k=1...M} X_k = X_1 + (1-X_1)X_2 + (1-(1-X_1)X_2)X_3 + ...$$

Reference is now made to FIG. 11, which is a schematic depiction of the matrix D for summing up the conditional probabilities among the features in the item list according to embodiments of the invention. To calculate the second element of the IFV according to Equation (5), the second row and the second column of matrix D may be summed. In general, the $i^{th}$ element of IFV is determined by the sum of the $i^{th}$ column and the $i^{th}$ row of matrix D.

In some implementations of the present invention, a data structure IFV may be used for the above calculations, which may be defined as having Usage: IFV=CalcIFV(I); Input: Item I; and Output: Item Feature Vector.

According to embodiments of the invention, a "free text" query provided by a user may be converted into a QFV. To do so, at least some possible textual combinations that may be found in the text may be scanned, and be compared with, for example, the semantic network features. The query may be segmented according to the list of features it found. Unknown words may be treated as separate features. All features may initially receive the same uniform default weight, e.g., DEFAULT_WEIGHT=0.5, and the output may be an updated feature list.

In some implementations of the present invention, a data structure Feature_List may be used for the above calculations, which may be defined as having Usage: Feature_List=ConvertQueryIntoFeatures(Query, DEFAULT_WEIGHT); Inputs: Query—the query text (e.g., "black shoes"), and DEFAULT_WEIGHT—default weight to use in the new vector; and Output: Feature List.

A valid Query Feature Vector (QFV), given a list of query features $P^Q$ may be generated, according to embodiments of the invention, using methods, procedures and algorithms as described below. A list $P^Q$ may consist of M feature-weight pairs $(N_k, w_k)$, where $N_k$ is the feature ID and $w_k$ corresponds to its weight. This vector may be used as a prototype vector and its spatial distance from the item feature vectors that populate the feature space may reflect the semantic affinity between the query and each one of the items.

In some implementations of the present invention, the steps for performing this calculation may be as follows. For each feature pair $(N_i, w_i)$ in the Query Features list $P^Q$, calculate the shortest path from feature $N_i$ node to each one of the feature $N_j$ nodes in the semantic network using the Dijkstra algorithm. For each feature $N_j$, calculate its conditional probability $p(N_j|N_i)$ according to the chain rule and put the result into element (j, i) of matrix D'. For each column of matrix D', normalize column i of matrix D' by its sum of probabilities if the sum exceeds the value of 1. Then, the QFV may be calculated, for example, using Equation 6:

$$QFV(j) = \bigoplus_{k \in 1...M} w_k D'_{jk}, \qquad (6)$$

where $\Sigma_k w_k = 1$.

In some implementations of the present invention, a data structure QFV may be used for the above calculations, which may be defined as having Usage: QFV=CalcQFV(Feature_List); Input: Items_List—feature-weight pairs (Nk, wk), where Nk is the feature ID and wk corresponds to its weight; and Output: QFV.

According to embodiments of the invention, the distance between Query Feature Vector (QFV) and Item Feature Vector (IFV) may equal to the scalar multiplication of both vectors: QFV·IFV. A system according to embodiments of the invention may rank at least some of the items in the database according to their distance between their correspondent IFV and QFV, for example, in descending order. Equation (7) shows the calculation of the distance between QFV and IFV which is the scalar multiplication of the two vectors:

$$dist(\overrightarrow{QFV}, \overrightarrow{IFV}) = \overrightarrow{QFV} \cdot \overrightarrow{IFV} = \sum_{i=1...N} QFV(i) \cdot IFV(i) \qquad (7)$$

In some implementations of the present invention, a ranking function may be used for the above calculations, which may be defined as having Usage: $(IFV_k, IFV_1 \ldots IFV_t)$=RankItems($\{IFV_1, IFV_2 \ldots IFV_N\}$, QFV); Input: list of IFV's, and the QFV; and Output: list of all the IFVs sorted by distance from the QFV.

Since a system according to embodiments of the invention may be required to deal with large number of items in realtime in certain applications, there may not be enough time to rank all the items for any given query. To overcome this problem, the system may define a subspace within the database that may keep the number of ranked items less than the number of items in the database while substantially not impairing the recall values. Database logic may be used to define the subspace for each query in the following way. First, the system may sort the QFV according to its weights. The features with the highest weights will be treated first and then all the other features. In each iteration, the "current feature" may be determined according to the order of the features in the sorted list. Next, in each iteration, the system may trim down the relevant subspace by requiring that the "current feature" appear in the retrieved items. The system may add more and more features to the requirement until the number of retrieved items decreases below a certain threshold. Then, the system may retrieve the items by applying different treatment to items with different weight ranking. For example, when the weight of a feature is in the upper region of the weight scale, for example having the value 4 or 5, in a 1-5 weight ranks system, the system may require the "current feature" to appear in the feature list of the item, (as in focus mechanism when the signal becomes very narrow). Thus, features that do not appear in any one of the feature lists will not be able to be addressed by this retrieval technique and their weights would be kept low, for example, below 4.

In some implementations of the present invention, data structures may be used by an algorithm embodying a method according to the invention for the above steps, having Usage: {IFVk ... IFVm}=ReduceSubspace(QFV); Input: QFV; and Output: list of all the IFVs that are located in the subspace.

There are many resources available, which may be used to enrich a semantic network with new nodes and new relations. For example, a table of associations may be a good source. An external network for example in the form of a table which may contain three columns may be imported. An imported table may contain the columns: source word, target words, and the respective weights. It is possible that the scale of an imported source may be different from the distribution of weights of the generated semantic network, the weights of, for example, the imported source, may be rescaled to match the distribution of weights of a local semantic network. The rescaling may be performed using, for example, standard techniques, so that both distributions may be as similar as possible to fit the new semantic network.

A system according to embodiments of the invention may be designed to work even when the input data is partial and/or not complete. Partial or incomplete data may enable the system to provide fair performance even when the feature description is not complete and when many data structures may not be available. A method according to the invention for achieving this ability may be embodied in an algorithm that may require the following input data structures.

An Items Repository may be a table that lists all the available items, and may contain columns including ItemID: unique key (integer); Title: title of the item (text); Description: textual description of the item (text); and Image: (if available, to be interpreted only by a human user rather than by a machine).

A List of features may be a table that lists all the features that the system is requested to search by, contains columns including FeatureID: unique key (integer); and Feature Label: (text).

A Partial Tagging table may be a table which assigns features to items columns including ItemID: unique key (integer); and FeatureID: unique key (integer).

An optional Ontology table may be a table that draws the relevant ontology, and may contain the columns including NodeID: unique key (integer); Node label: the category name (text); and ParentID: the unique key of the parent (integer).

An optional Category Assignment table may be a table that assigns a category to an item, and may contain columns including ItemID: unique key (integer); and NodeID: unique key (integer).

An optional Dictionary may be a table that converts words and terms into hash key representation, and may include WordID: unique key (integer), and Word: the word (text).

An optional Semantic/Associative Network may import external tables of semantic/associative networks, including WordID: WordID of the source word (integer), WordID: WordID of the target word (integer), and Weight: the weight of the relation (weight).

Figure 12:
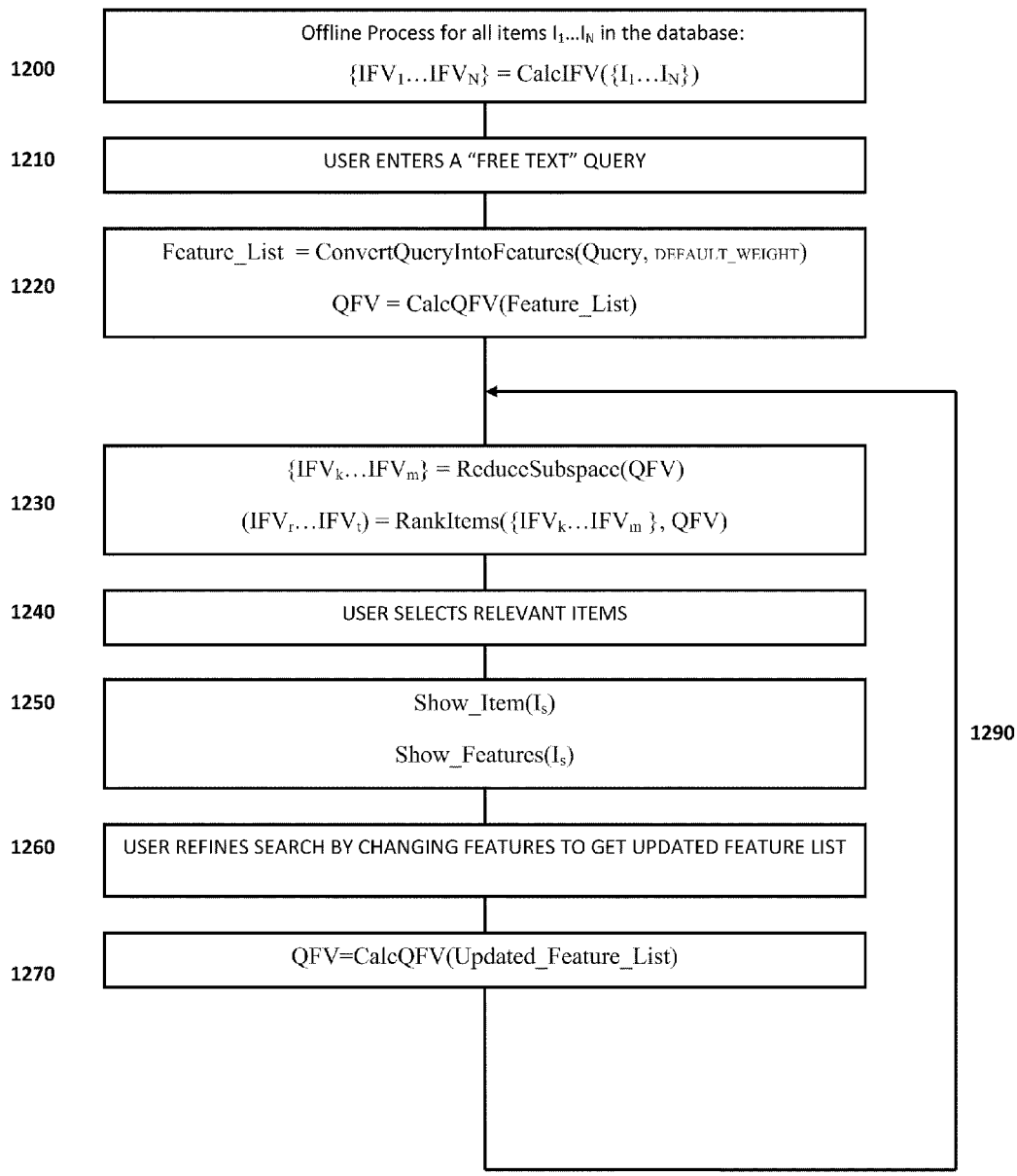
FIG. 12 is a flowchart representation of a search process according to embodiments of the present invention.

Reference is now made to FIG. 12, which is a flowchart representation of a search process according to embodiments of the present invention. The system may scan offline the repository of items and calculate for each item its correspondent IFV, referred to as semantic indexing process (block 1200). A free-text may be entered by a user (block 1210) to define features of a searched item in the database. A Query Feature Vector (QFV) may be obtained by first converting the data entered by the user into a list of features by using default weights and then converting the list into a QFV (block 1220). Optionally, the feature space may be reduced by selecting only a subspace which contains the most significant feature. The items may be ranked in the subspace according to their distance between their respective IFV and the QFV in descending order. Then, the sorted items may be presented to the user (block 1230). A user may select relevant items from the recently retrieved sorted items (block 1240) and the updated selection may be retrieved by the system (block 1250). The user may now select from the retrieved list of features, the features which seem to better fit his needs and thus be more relevant for his search or the user may omit features that seem not relevant any more (block 1260). Once the user selects the features and weights them according to his needs the updated selection of features may be processed by the system as a new reference vector and an updated QFV may be calculated (block 1270) and be used as an updated input to block 1230 for optionally performing another iteration of the operations of blocks 1230 to 1270.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of computerized searching comprising:
receiving a search query including a plurality of features;
assigning to each of said plurality of features a respective weight;
retrieving a first plurality of retrieved items based on said features and said weights;
displaying at least a portion of said retrieved items to a user;
receiving a user selection of at least one of said first plurality of retrieved items;
modifying said weights based on features of said at least one selected retrieved item; and
retrieving a second plurality of retrieved items based on said modified weights,
after receiving said user selection of said retrieved item:
suggesting at least one additional feature based on features of said selected retrieved item; and
assigning at least one respective weight to said at least one additional feature,
wherein retrieving said second plurality of retrieved items comprises retrieving said second plurality of retrieved items on said features and modified weights, and based on said additional features and said weights.

2. The method of claim 1, wherein said search query is a free-text query, the method further comprising parsing said free-text query to obtain said plurality of features.

3. The method of claim 1, further comprising displaying a plurality of scales, each said scale associated with a respective feature and representing said respective weight associated with said feature, wherein assigning said respective weights comprises assigning said respective weights to features based on a user selection of said weight on said scale.

4. The method of claim 1, wherein assigning said respective weights comprises assigning a uniform default weight to each of said features.

5. A system for computerized searching comprising:
an input unit to receive a search query including a plurality of features;
a processor to:
assign to each of said plurality of features a respective weight, and
retrieve a first plurality of retrieved items based on said features and said weights,
a display unit for displaying at least a portion of said retrieved items to a user,
wherein said input unit is further to receive a user selection of at least one of said first plurality of retrieved items, and wherein said processor is further to:
modify said weights based on features of said at least one selected retrieved item, and
retrieve a second plurality of retrieved items based on said modified weights,
wherein after receiving said user selection of said retrieved item, said processor is further to:
suggest at least one additional feature based on features of said selected retrieved item; and
assign at least one respective weight to said at least one additional feature,
wherein said processor is to retrieve said second plurality of retrieved items by retrieving said second plurality of retrieved items on said features and modified weights, and based on said additional features and said weights.

6. The system of claim 5, wherein said search query is a free-text query, and wherein said processor is to parse said free-text query to obtain said plurality of features.

7. The system of claim 5, wherein said display is further to display a plurality of scales, each said scale associated with a respective feature and representing said respective weight associated with said feature, wherein said processor is to assign said respective weights by assigning said respective weights to features based on a user selection of said weight on said scale.

8. The system of claim 5, wherein said processor is further to assign said respective weights by assigning a uniform default weight to each of said features.

9. A computer program product, comprising a computer usable medium having a computer readable program code embodied therein, said computer readable program code adapted to be executed to implement a method of computerized searching comprising:
receiving a search query including a plurality of features;
assigning to each of said plurality of features a respective weight;
retrieving a first plurality of retrieved items based on said features and said weights;
displaying at least a portion of said retrieved items to a user;
receiving a user selection of at least one of said first plurality of retrieved items;

modifying said weights based on features of said at least one selected retrieved item; and retrieving a second plurality of retrieved items based on said modified weights, after receiving said user selection of said retrieved item:

suggesting at least one additional feature based on features of said selected retrieved item; and assigning at least one respective weight to said at least one additional feature, wherein retrieving said second plurality of retrieved items comprises retrieving said second plurality of retrieved items on said features and modified weights, and based on said additional features and said weights.

10. The computer program product of claim 9, wherein said search query is a free-text query, the method further comprising parsing said free-text query to obtain said plurality of features.

11. The computer program product of claim 9, further comprising displaying a plurality of scales, each said scale associated with a respective feature and representing said respective weight associated with said feature, wherein assigning said respective weights comprises assigning said respective weights to features based on a user selection of said weight on said scale.

12. The computer program product of claim 9, wherein assigning said respective weights comprises assigning a uniform default weight to each of said features.

* * * * *